(12) United States Patent
    Ichida

(10) Patent No.: US 12,559,114 B2
(45) Date of Patent: Feb. 24, 2026

(54) VEHICLE DEVICE AND VEHICLE CONTROL METHOD

(71) Applicant: DENSO CORPORATION, Kariya (JP)

(72) Inventor: Noriaki Ichida, Kariya (JP)

(73) Assignee: DENSO CORPORATION, Kariya (JP)

( * ) Notice: Subject to any disclaimer, the term of this patent is extended or adjusted under 35 U.S.C. 154(b) by 118 days.

(21) Appl. No.: 18/405,586

(22) Filed: Jan. 5, 2024

(65) Prior Publication Data

US 2024/0140450 A1    May 2, 2024

Related U.S. Application Data

(63) Continuation of application No. PCT/JP2022/022762, filed on Jun. 6, 2022.

(30) Foreign Application Priority Data

Jul. 9, 2021    (JP) ................................. 2021-114258

(51) Int. Cl.
    *B60W 50/029*    (2012.01)
    *B60W 30/09*    (2012.01)
    (Continued)

(52) U.S. Cl.
    CPC .......... *B60W 50/029* (2013.01); *B60W 30/09* (2013.01); *G01S 13/865* (2013.01); *G01S 13/867* (2013.01); *G01S 13/931* (2013.01); *B60W 2420/403* (2013.01); *B60W 2420/408* (2024.01); *B60W 2554/801* (2020.02); *G01S 2013/93271* (2020.01)

(58) Field of Classification Search
    CPC ..... B60W 2420/403; B60W 2420/408; B60W 2554/801; B60W 30/09; B60W 50/023; B60W 50/029; B60W 50/04; G01S 13/865; G01S 13/867; G01S 13/931; G01S 2013/93271; G01S 2013/93274; G08G 1/16

See application file for complete search history.

(56) References Cited

U.S. PATENT DOCUMENTS

| | | | |
|---|---|---|---|
| 12,202,495 B2 * | 1/2025 | Bösch | G06F 11/0739 |
| 2017/0270798 A1 * | 9/2017 | Ushiba | B60W 60/0059 |

(Continued)

FOREIGN PATENT DOCUMENTS

| | | | | |
|---|---|---|---|---|
| DE | 102018220054 A1 * | 5/2020 | | G05B 9/03 |
| DE | 102018220605 B4 * | 4/2024 | | B60W 50/0205 |
| EP | 3587194 A2 * | 1/2020 | | H04L 67/12 |

*Primary Examiner* — Babar Sarwar
(74) *Attorney, Agent, or Firm* — Maschoff Brennan

(57)    ABSTRACT

A First sensor unit is operable when supplied with electric power from a first power supply unit to detect a front obstacle in front of a vehicle and to detect lateral position information on a position of the vehicle in a road width direction. A first control device is operable when supplied with electric power from the first power supply unit to control the vehicle based on a detection result of the first sensor unit. A second sensor unit is operable when supplied with electric power from a second power supply unit to detect the front obstacle and to detect the lateral position information. A second control device is operable when supplied with electric power from the second power supply unit to control the vehicle based on a detection result of the second sensor unit.

13 Claims, 8 Drawing Sheets

(51) Int. Cl.
  G01S 13/86      (2006.01)
  G01S 13/931     (2020.01)

(56)              References Cited

U.S. PATENT DOCUMENTS

| | | | | |
|---|---|---|---|---|
| 2019/0263425 A1* | 8/2019 | Kanoh | .................. | B60W 50/14 |
| 2020/0064483 A1* | 2/2020 | Li | .......................... | G01S 13/867 |
| 2020/0079378 A1* | 3/2020 | Ochida | ................. | B60W 30/09 |
| 2020/0125858 A1* | 4/2020 | Bauer | ................. | G06F 11/2007 |
| 2020/0164892 A1* | 5/2020 | Plecko | ................. | B60W 50/04 |
| 2021/0362706 A1* | 11/2021 | Horiguchi | ......... | B60W 50/0097 |
| 2022/0284711 A1* | 9/2022 | Bauer | ................. | G05D 1/0088 |

\* cited by examiner

NORMAL AUTOMATIC DRIVING CONTROL

FIG. 6

| | | SENSOR | LONGITUDINAL DIRECTION CONTROL | LATERAL DIRECTION CONTROL |
|---|---|---|---|---|
| 1 | V1 | FRONT MILLIMETER WAVE RADAR 30 | ✔ | |
| 2 | V2 | FRONT LATERAL MILLIMETER WAVE RADAR 50L, 50R | ✔ | |
| 3 | V3 | LiDAR 80 | ✔ | |
| 4 | H1 | FRONT CAMERA 40 | | ✔ |
| 5 | H2 | PERIPHERAL CAMERA 60 | | ✔ |
| 6 | H3 | POSITION DETECTION SENSOR 90 + MAP 91 | | ✔ |
| 7 | VH | FRONT CAMERA 40 + POSITION DETECTION PROCESSOR 93 | ✔ | ✔ |

FIG. 8

| PATTERN | COMBINATION | FIRST SENSOR UNIT | SECOND SENSOR UNIT |
|---|---|---|---|
| | | FIRST POWER SUPPLY UNIT 21 SoC 71 | SECOND POWER SUPPLY UNIT 22 SoC 72 |
| 1 | V1, V2, H1, H2 | V1, H1 | V2, H2 |
| | | V2, H1 | V1, H2 |
| 2 | V1, V3, H1, H3 | V1, H1 | V3, H3 |
| | | V3, H1 | V1, H3 |
| 3 | V1, V3, H1, H2 | V1, H1 | V3, H2 |
| | | V3, H1 | V1, H2 |
| 4 | VH, V3, H3 | VH | V3, H3 |
| 5 | VH1, VH2 | VH1 | VH2 |
| 6 | VH, V2, H2 | VH | V2, H2 |
| 7 | V1, V2, H1, H3 | V1, H1 | V2, H3 |
| | | V2, H1 | V1, H3 |

VEHICLE DEVICE AND VEHICLE CONTROL METHOD

CROSS REFERENCE TO RELATED APPLICATION

The present application is a continuation application of International Patent Application No. PCT/JP2022/022762 filed on Jun. 6, 2022, which designated the U.S. and claims the benefit of priority from Japanese Patent Application No. 2021-114258 filed on Jul. 9, 2021. The entire disclosures of all of the above applications are incorporated herein by reference.

TECHNICAL FIELD

The present disclosure relates to a vehicle device and a vehicle control method.

BACKGROUND

Various devices for controlling vehicles are known.

SUMMARY

According to an aspect of the present disclosure, a vehicle device is for a vehicle and includes a first power supply unit; a second power supply unit; a first sensor unit operable when supplied with electric power from the first power supply unit; a first control device operable when supplied with electric power from the first power supply unit; a second sensor unit operable when supplied with electric power from the second power supply unit; and a second control device operable when supplied with electric power from the second power supply unit.

BRIEF DESCRIPTION OF THE DRAWINGS

The above and other objects, features and advantages of the present disclosure will become more apparent from the following detailed description made with reference to the accompanying drawings. In the drawings:

FIG. 6 is a diagram of sensors that can be used in a first sensor unit or a second sensor unit;

FIG. 8 is a diagram of combinations of sensors that can be realized as the first sensor unit and the second sensor unit.

DETAILED DESCRIPTION

Figure 1:
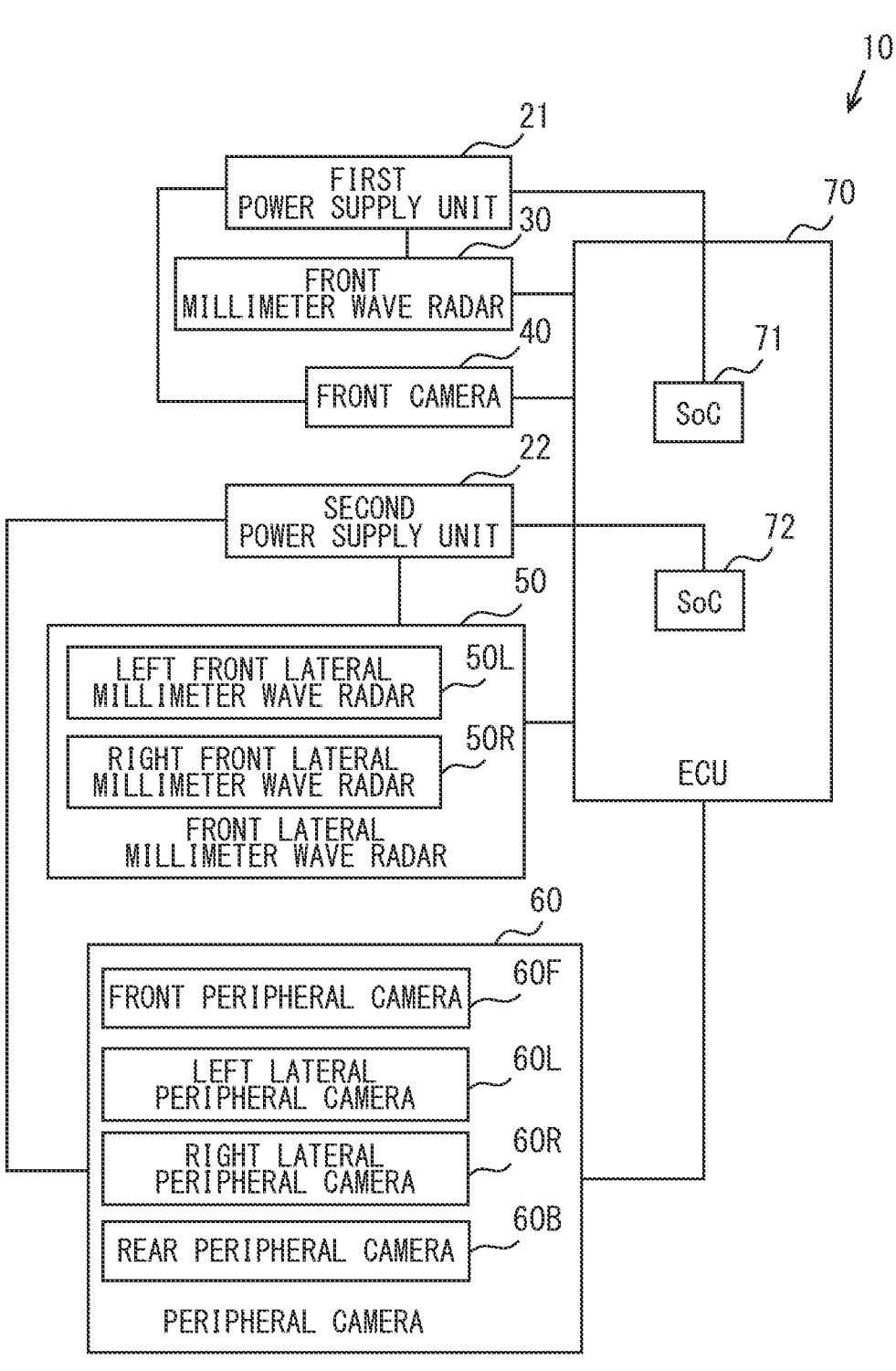
FIG. 1 is a diagram of a configuration of a vehicle device according to a first embodiment.

Hereinafter, examples of the present disclosure will be described.

According to an example of the present disclosure, a device includes an integration unit that integrates sensor information from a plurality of sensors and determines whether the integration unit is abnormal. The integration unit has a redundant configuration to ensure its reliability.

The integration unit or the sensors integrated by the integration unit with a redundant configuration enables to continue the vehicle control with high possibility, even when a problem occurs in some configuration. However, redundancy may increase the number of configuration elements required for controlling the vehicle with the same accuracy.

According to an example of the present disclosure, a vehicle device if for use in a vehicle. The vehicle device comprises:

a first power supply unit;

a second power supply unit;

a first sensor unit operable when supplied with electric power from the first power supply unit to detect a front obstacle in front of the vehicle and to detect lateral position information on a position of the vehicle in a road width direction;

a first control device operable when supplied with electric power from the first power supply unit to control the vehicle based on a detection result of the first sensor unit;

a second sensor unit operable when supplied with electric power from the second power supply unit to detect the front obstacle and to detect the lateral position information; and a second control device operable when supplied with electric power from the second power supply unit to control the vehicle based on a detection result of the second sensor unit.

According to an example of the present disclosure, a vehicle control method is to be implemented by a processor for a vehicle. The vehicle includes: a first power supply unit; a second power supply unit; a first sensor unit operable when supplied with electric power from the first power supply unit to detect a front obstacle in front of the vehicle and to detect lateral position information on a position of the vehicle in a road width direction; and a second sensor unit operable when supplied with electric power from the second power supply unit to detect the front obstacle and to detect the lateral position information. The vehicle control method comprises:

performing, when the first power supply unit, the first sensor unit, the second power supply unit, and the second sensor unit are normal, at least one of a longitudinal integration process to acquire detection results of the front obstacle respectively from the first sensor unit and the second sensor unit and integrate the detection results of the front obstacle, and a lateral integration process to acquire the lateral position information respectively from the first sensor unit and the second sensor unit and integrate the lateral position information;

performing, when at least one of the second power supply unit and the second sensor unit is detected as abnormal, a restricted control by using the first sensor unit and by not using the second sensor unit, wherein the restricted control is a vehicle control to allow the vehicle to travel while detecting the front obstacle and the lateral position information and restricted than a normal automated driving control performed at a time of detecting no abnormality; and performing, when at least one of the first power supply unit and the first sensor unit is detected as abnormal, the restricted control by not using the first sensor unit and by using the second sensor unit.

According to the vehicle control method described above, even when one or more of the first sensor unit, the first control device, and the first power supply unit become abnormal, the restricted control that allows the vehicle to continue a travel while detecting the front obstacle and the lateral position information by using the second sensor unit, the second control device, and the second power supply unit is performable. Further, even when one or more of the second sensor unit, second control device, and second power supply unit become abnormal, the restricted control is performable by using the first sensor unit, the first control device, and the first power supply unit.

In addition, when the first sensor unit, the second sensor unit, the first power supply unit, and the second power supply unit are normal, at least one of the longitudinal integration process that integrates detection results from the first sensor unit and detection results from the second sensor unit, and the lateral integration process is performed, thereby a highly-accurate vehicle control is performable. This vehicle control method uses either the first sensor unit or the second sensor unit even when controlling a travel of the vehicle having abnormality. Therefore, while suppressing the increase in the number of configuration elements, a travel of the vehicle is continuable even with abnormality.

First Embodiment

Hereinafter, embodiments will be described based on the drawings. FIG. 1 is a diagram showing the configuration of a vehicle device 10 according to the first embodiment. The vehicle device 10 is mounted on a vehicle C shown in FIG. 2. The vehicle device 10 controls one or both of the steering and speed of the vehicle C, at least temporarily, without requiring any operation by the driver.

The vehicle device 10 can perform automated driving at an automated driving level 3. At an automated driving level 3, a device performs all driving operations under limited conditions. However, in an emergency, the driver performs control. The vehicle device 10 may be capable of performing automated driving levels other than the automated driving level 3, e.g., automated driving levels 1, 2, 4, and the like. Furthermore, the vehicle C can travel even when the vehicle device 10 does not function, that is, at an automated driving level 0.

The vehicle device 10 includes two power supply units, i.e., a first power supply unit 21 and a second power supply unit 22, a plurality of sensors for detecting a situation in a surrounding area of the vehicle C, and an ECU 70. The first power supply unit 21 and the second power supply unit 22 are mutually independent power supply units. Both the first power supply unit 21 and the second power supply unit 22 can be charged with electric power generated by a generator mounted on the vehicle C. The first power supply unit 21 and the second power supply unit 22 can employ batteries using various materials, such as a lead acid battery, a nickel-metal hydride secondary battery, a lithium ion secondary battery and the like.

Specifically, in the vehicle device 10 of the first embodiment, a plurality of sensors for detecting a situation in a surrounding area of the vehicle C include a front millimeter wave radar 30, a front camera 40, a front lateral millimeter wave radar 50, and a peripheral camera 60.

The front millimeter wave radar 30 irradiates a field of view with millimeter waves as transmission waves, and receives reflected waves generated when the transmission waves are reflected by objects. The front millimeter wave radar 30 detects a position and direction from the vehicle C to an external object based on a time difference between transmission and reception and an irradiation direction of the transmission wave. The field of view of the front millimeter wave radar 30 includes a front of the vehicle C, and the front millimeter wave radar 30 detects a front obstacle that exists in front of the vehicle C. An obstacle includes a stationary object and a moving object. An example of a moving object is a front vehicle that travels in the same lane as the vehicle C. The mounting position of the front millimeter wave radar 30 is, for example, a front end of the vehicle C and at a center in a vehicle width direction. An example of a viewing angle of the front millimeter wave radar 30 is approximately ±60 degrees, with the front of the vehicle C being set as 0 degree.

Figure 2:
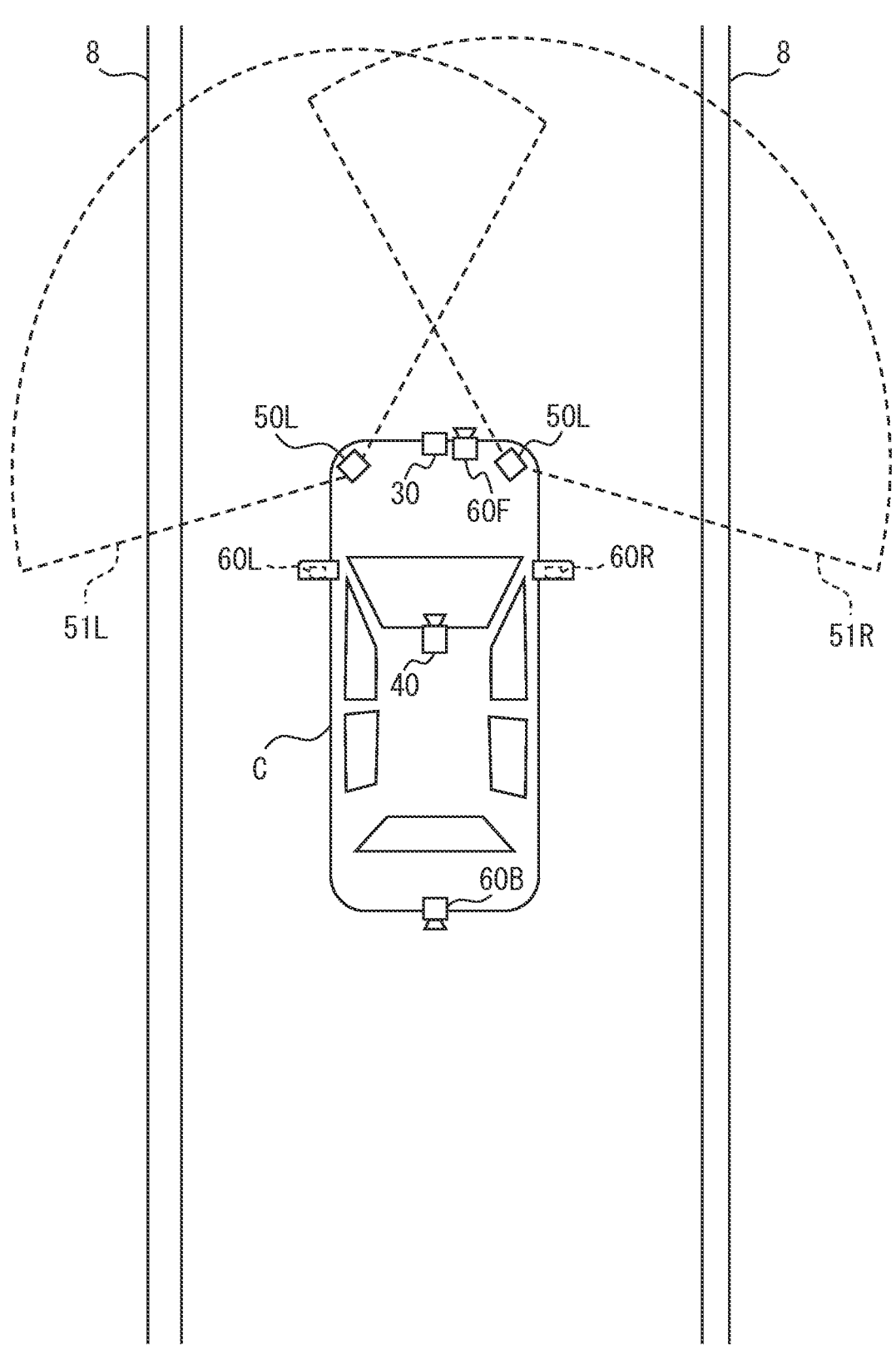
FIG. 2 is a diagram illustrating a sensor mounting position and fields of view 51L, 51L of a front lateral millimeter wave radar.

The front camera 40 is a monocular camera that photographs the front of the vehicle C. In the present embodiment, the front camera 40 is used to detect lane boundaries. Lane boundaries define a boundary of traffic lanes. An example of a lane boundary is a lane dividing line 8 shown in FIG. 2. On roads where lane dividing lines 8 do not exist, a road edge becomes the road boundary. As shown in FIG. 2, an installation position of the front camera 40 is, for example, inside a cabin of the vehicle C, near the front end of a roof. The front camera 40 preferably has a wide field of view of 100 degrees or more so that the lane dividing line 8 can be detected in the proximity of the vehicle C. However, since the lane dividing lines 8 also extend in a front direction along the vehicle C, the field of view may be narrower than 100 degrees.

The front millimeter wave radar 30 and the front camera 40 are, respectively, a first sensor unit that operates by receiving supply of electric power from the first power supply unit 21.

The front lateral millimeter wave radar 50 includes a left front lateral millimeter wave radar 50L and a right front lateral millimeter wave radar 50R. The left front lateral millimeter wave radar 50L and the right front lateral millimeter wave radar 50R are, respectively, a radar for detecting obstacles existing on a left side and a right side of the vehicle C. The left front lateral millimeter wave radar 50L is installed at a left front end of the vehicle C, and the right front lateral millimeter wave radar 50R is installed at a right front end of the vehicle C. It is necessary to detect obstacles over a wide range on the sides of the vehicle C. Therefore, the left front lateral millimeter wave radar 50L and the right front lateral millimeter wave radar 50R have a wider field of view than the front millimeter wave radar 30. FIG. 2 illustrates the fields of view 51L and 51R of the left front lateral millimeter wave radar 50L and the right front lateral millimeter wave radar 50R. The left front lateral millimeter wave radar 50L and the right front lateral millimeter wave radar 50R each have a front field of view set as a diagonal front of the vehicle C.

Like the front millimeter wave radar 30, the front lateral millimeter wave radar 50 detects the position and direction from the vehicle C to an external object based on the time difference between transmission and reception of millimeter waves and the irradiation direction of the transmission wave.

Since the fields of view 51L and 51R of the left front lateral millimeter wave radar 50L and the right front lateral millimeter wave radar 50R are wide, the field of view that combines the two fields of view 51L and 51R is a field of view that also includes the front of the vehicle C. Specifically, the fields of view 51L and 51R are ±60 degrees respectively centered on a front direction of the left front lateral millimeter wave radar 50L and the right front lateral millimeter wave radar 50R.

The peripheral camera 60 includes a front peripheral camera 60F, a left lateral peripheral camera 60L, a right lateral peripheral camera 60R, and a rear peripheral camera 60B. The front peripheral camera 60F is installed at the front end of the vehicle C at the center in the vehicle width direction. The left lateral peripheral camera 60L is installed on a lower surface of a left door mirror of the vehicle C. The right lateral peripheral camera 60R is installed on a lower surface of a right door mirror of the vehicle C. The rear peripheral camera 60B is installed at a rear end of the vehicle C and at the center in the vehicle width direction.

The four peripheral cameras 60 are provided for the purpose of creating a bird's-eye view of the vehicle C from above by converting the coordinates of the images taken by these four peripheral cameras 60. Since the camera is used for such purpose, the range photographed by the peripheral camera 60 is around the vehicle C. In other words, the photographing range of the peripheral camera 60 is closer to the vehicle C than the photographing range of the front camera 40.

Figure 3:
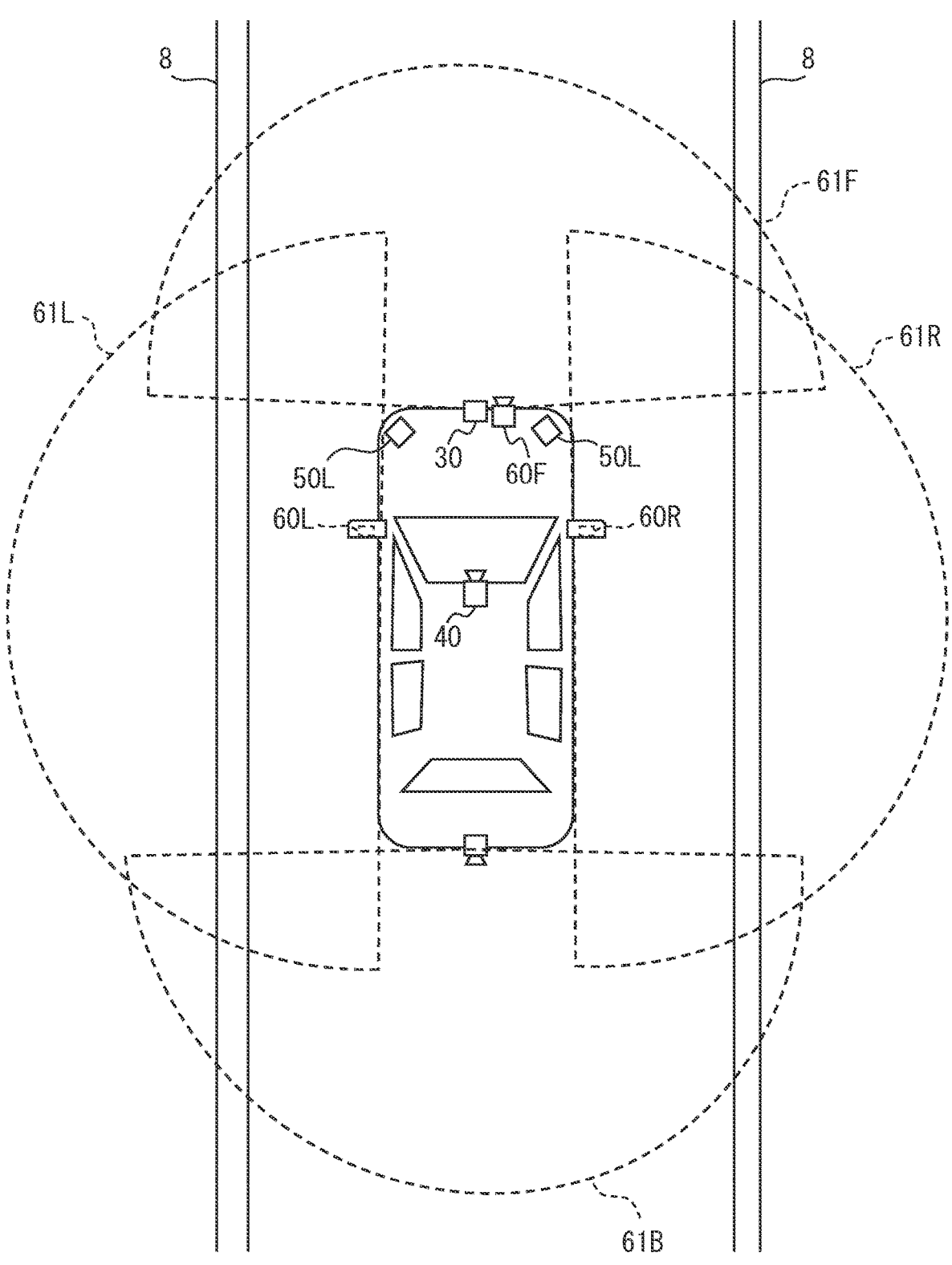
FIG. 3 is a diagram illustrating a photographing range of a peripheral camera 60.

FIG. 3 is a diagram illustrating the photographing range of the peripheral camera 60. The front peripheral camera 60F, the left lateral peripheral camera 60L, the right lateral peripheral camera 60R, and the rear peripheral camera 60B all have a wide field of view. Therefore, a photographing range 61F of the front peripheral camera 60F, a photographing range 61L of the left lateral peripheral camera 60L, a photographing range 61R of the right lateral peripheral camera 60R, and a photographing range 61B of the rear peripheral camera 60B all cover a body of the vehicle C or the proximity thereof. Furthermore, the photographing ranges 61F, 61L, 61R, and 61B partially overlap with two adjacent photographing ranges. Since images of such photographing ranges 61F, 61L, 61R, and 61B are photographed, a bird's-eye view image can be created by coordinate transformation of the images photographed by the four peripheral cameras 60.

The front lateral millimeter wave radar 50 and the peripheral camera 60 are respectively a second sensor unit that is operated by being supplied with electric power from the second power supply unit 22.

The ECU 70 includes two SoCs (System-on-a-chip) 71 and 72. The SoC 71 is a first control device, and the SoC 72 is a second control device, each of which has a processor. For example, the SoCs 71 and 72 have a configuration including a processor, a nonvolatile memory, a RAM, a bus line connecting these components, and the like. A vehicle control program executed by the processor is stored in the nonvolatile memory. The SoCs 71 and 72 can each perform abnormality control, which will be described later, by the processor executing the program stored in the nonvolatile memory while utilizing the temporary memory function of the RAM. Further, the SoC 71 and the SoC 72 can also execute the normal automated driving control, which will be described later. Performing these controls means that a vehicle control method corresponding to the program is performed.

In such manner, the SoC 71 and the SoC 72 are capable of performing the same control, but have different power supplies. The SoC 71 operates by receiving a supply of electric power from the first power supply unit 21. The SoC 72 operates by receiving a supply of electric power from the second power supply unit 22.

[Normal Automated Driving Control]

Next, the normal automated driving control performed by the SoCs 71 and 72 will be described. The normal automated driving control is performed by either of the SoC 71 or the SoC 72, which is set in advance. In the following description, it will be assumed that the SoC 71 performs the normal automated driving control. The normal automated driving control is a control that is performed when the vehicle C is under an automated driving control and the SoC 71 has not detected any abnormality. Further, it is assumed that the automated driving control is a control at the automated driving level 3.

Figure 4:
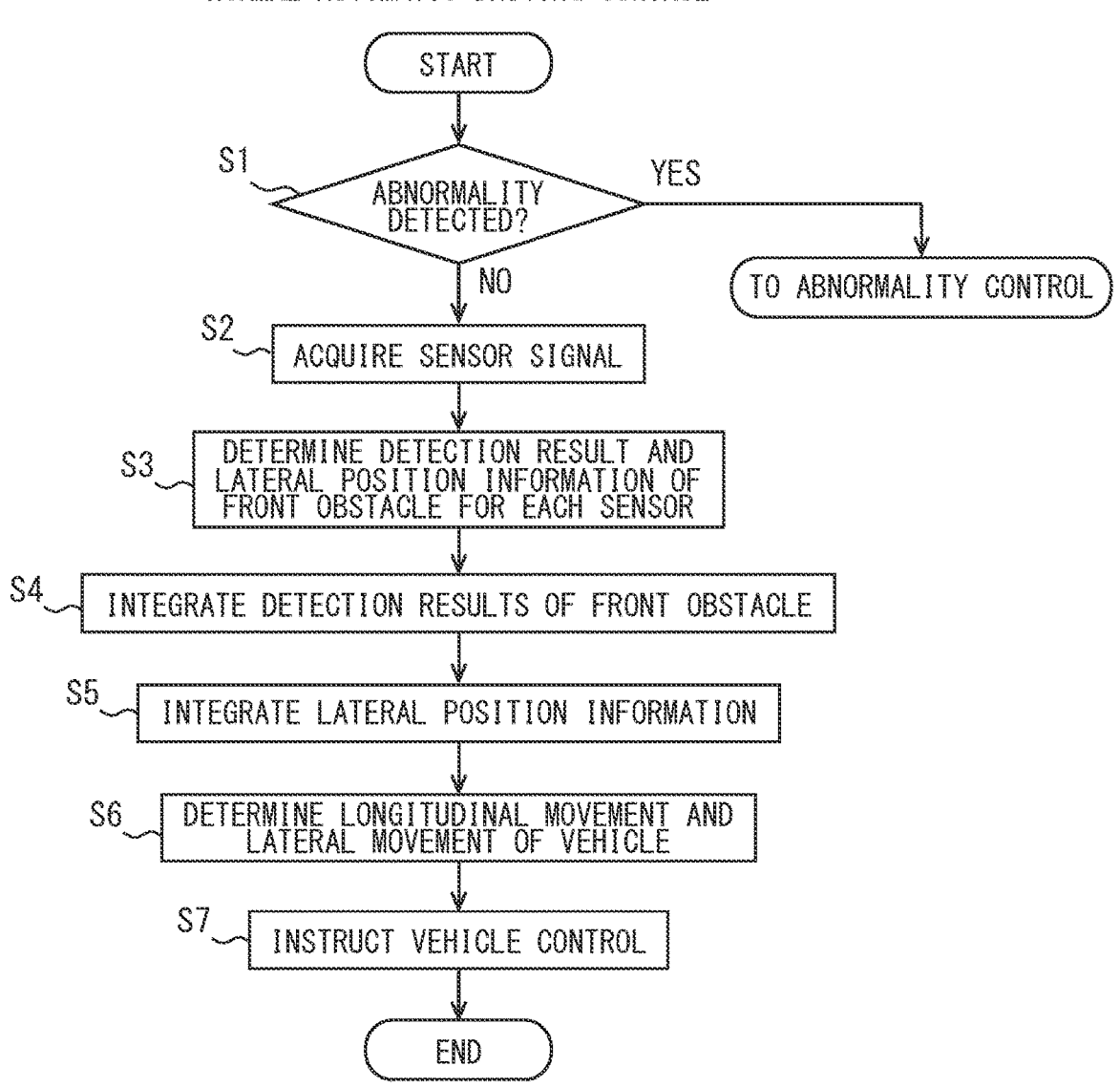
FIG. 4 is a diagram of a normal automated driving control.

FIG. 4 shows a flowchart of the normal automated driving control. Only S1 is performed by both of the SoC 71 and the SoC 72. The SoCs 71 and 72 determine whether or not an abnormality is detected. The targets for determining abnormality are the first power supply unit 21, the second power supply unit 22, the front millimeter wave radar 30, the front camera 40, the front lateral millimeter wave radar 50, the peripheral camera 60, the SoC 71, and the SoC 72.

Either of the SoCs 71 or 72 may determine whether the front millimeter wave radar 30, the front camera 40, the front lateral millimeter wave radar 50, or the peripheral camera 60 is abnormal. Either of the SoCs 71 or 72 may also determine whether the first power supply unit 21 or the second power supply unit 22 is abnormal. However, the SoC 72 that does not receive power supply from the first power supply unit 21 preferably determines whether the first power supply unit 21 is abnormal, and the SoC 72 that does not receive power supply from the second power supply unit 22 preferably determines whether the second power supply unit 22 is abnormal. The SoC 72 determines whether the SoC 71 is abnormal, and the SoC 71 determines whether the SoC 72 is abnormal.

The fact that the power supply units 21 and 22 are abnormal means that a voltage within a specified range is not input. When a disconnection, a failure of the power supply units 21, 22, and the like occur, the voltage input to the ECU 70 will fall below the specified range. Furthermore, if a high voltage exceeding the specified range is input to the ECU 70, it is assumed that the power supply units 21 and 22 are abnormal. Whether or not the front millimeter wave radar 30, front camera 40, the front lateral millimeter wave radar 50, or the peripheral camera 60 is abnormal is determined based on, for example, the levels of signals obtained therefrom and the like. Note that for one of the SoCs 71 and 72 with which the normal automated driving control is not performed, since the control is not being performed with the SoC, the determination as to whether or not it has an abnormality may be omitted.

When a determination result in S1 is NO, the SoC 71 advances the process to S2. In S2, the front millimeter wave radar 30, the front camera 40, the front lateral millimeter wave radar 50, and the peripheral camera 60 are controlled to acquire sensor signals from these sensors.

Subsequently in S3, a detection result of the front obstacle is determined for each sensor based on the sensor signals acquired in S2. Further, the lateral position information is determined for each sensor. The detection result of the front obstacle includes the presence or absence of the front obstacle and the position of the front obstacle (in other words, the distance to the front obstacle). Furthermore, the size of the front obstacle and the type of the front obstacle may be included in the detection result of the front obstacle. In the present embodiment, the sensors used to detect the front obstacle are the front millimeter wave radar 30 and the front lateral millimeter wave radar 50. The SoC 71 determines the detection result of the front obstacle based on the sensor signals acquired from the front millimeter wave radar 30 and the front lateral millimeter wave radar 50.

The lateral position information is information on the position of the vehicle C in the road width direction. An example of the lateral position information is a lane boundary that exists on the side of the vehicle C. Note that the side of the vehicle here includes not only the position right beside the vehicle but also the diagonally lateral side. In the present embodiment, the sensors used to detect the lateral position information are the front camera 40 and the peripheral camera 60. The front camera 40 and the peripheral camera 60 can take images that include lane boundaries on the sides of the vehicle C. The SoC 71 uses image processing to detect the lane dividing line 8 or road edges from images taken by the front camera 40 or the peripheral camera 60.

After performing S3, the process proceeds to S4. When proceeding to S4, the detection result and the lateral position information on the front obstacle have been acquired from the first sensor unit and the second sensor unit, respectively. Therefore, an integration process is performed in S4 and S5. The process performed in S4 is the longitudinal integration process, and the process performed in S5 is the lateral integration process. In S4, the detection results of the front obstacle determined for each sensor in S3 are integrated. For example, the position of the front obstacle is determined by simply averaging or weighted averaging the positions of the front obstacle determined for each sensor.

In S5, the lateral position information determined for each sensor in S3 is integrated. For example, the position of the front obstacle is determined by simply averaging or weighted averaging the lane boundary positions determined for each sensor. The integration process of S4 and S5 is sometimes called as a sensor fusion.

The SoC 71 also calculates a distance in the road width direction from the vehicle C to the lane boundary. Since the installation position and the field of view of the front camera 40 and the peripheral camera 60 are fixed, there is a one-to-one correspondence between road surface positions corresponding to arbitrary positions on the image. Therefore, when it is determinable where the lane boundary exists in the image taken by the front camera 40 or the peripheral camera 60, the distance in the road width direction from the vehicle C to the lane boundary is calculable.

In S6, the longitudinal and lateral moves of the vehicle C are determined using the processing results of S4 and S5. The longitudinal movement of the vehicle C means that the speed of the vehicle C is determined. The lateral movement of the vehicle C is means that the steering angle of the vehicle C is determined. For example, the SoC 71 may determine to reduce the speed of the vehicle C when the distance to the front obstacle becomes shorter. Further, the SoC 71 may determine to change the steering angle to follow the shape of the lane dividing line 8. When performing the automated driving control, the SoC 71 can use various information such as route information to a destination in addition to the detection results of the front obstacle and the lateral position information. Then, the SoC 71 may determine to perform a steering operation to change lanes when the distance to the front obstacle becomes short or when making a right or left turn.

In S7, a control device that controls acceleration/deceleration of the vehicle C and a control device that controls a steering operation of the vehicle C are instructed to perform the movement determined in S6. After performing S7, the process returns to S1.

[Abnormality Control]

Figure 5:
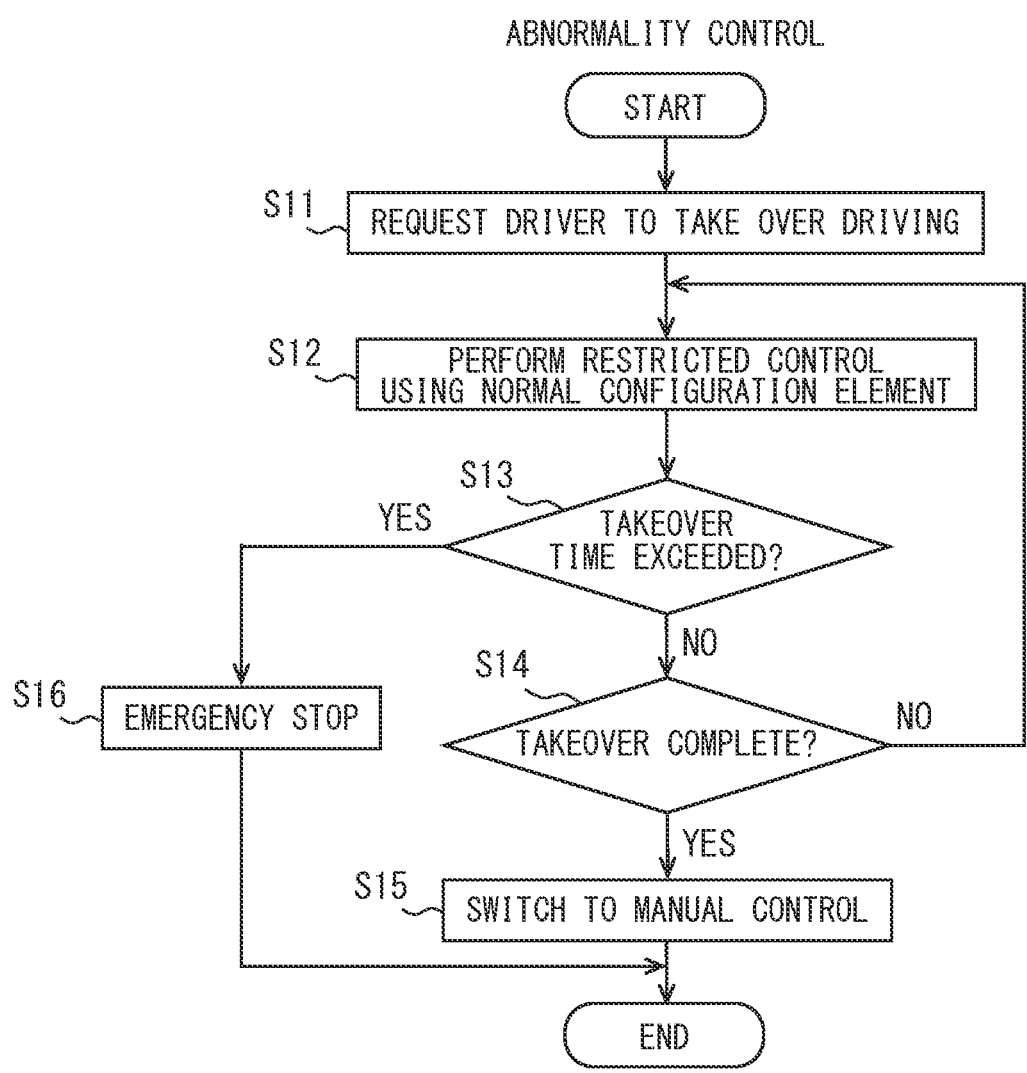
FIG. 5 is a diagram of an abnormality control.

Next, the abnormality control performed when the determination result in S1 in FIG. 4 is YES will be described. FIG. 5 shows an abnormality control. In S11, information requesting the driver to take over driving is output. This information may be images and/or sounds. For example, a message requesting a driving takeover is displayed on a display placed in a position visible to the driver of the vehicle C.

Subsequently in S12, a restricted control is performed using normal configuration elements. The restricted control is a control that continues automated control of the vehicle C without using a configuration in which an abnormality was detected in the process of S1. When an abnormality in the power supply units 21 and 22 is detected, the configuration elements to which electric power is supplied from the power supply units 21 and 22 where the abnormality has been detected are not used. For example, when it is detected that the first power supply unit 21 is abnormal, the front millimeter wave radar 30 and the front camera 40 are not used for control either. Further, when it is detected that the first power supply unit 21 is abnormal, the SoC 72 performs the restricted control instead of the SoC 71 that receives supply of electric power from the first power supply unit 21. In the restricted control, even when only one of the front millimeter wave radar 30 and the front camera 40, which are respectively the first sensor unit, becomes abnormal, the entire first sensor unit may not be used for control. Similarly, in the restricted control, even when only one of the front lateral millimeter wave radar 50 and the peripheral camera 60, which are respectively the second sensor unit, becomes abnormal, the entire second sensor unit may not be used for control. Automatic driving of the vehicle C under restricted control is sometimes called degeneration operation.

In the restricted control, the number of usable configurations is reduced by one or more than in a normal control. Therefore, the restricted control is less reliable than the normal automated driving control. Therefore, the restricted control performs a control that is more restricted than the normal automated driving control. As a specific example of restriction, functions can be restricted, such as prohibiting a lane change. When the lane change is prohibited, a lane keeping control will continue. It is also possible to restrict an upper limit speed for automated driving. It is also possible to restrict an amount of time of the automated driving.

Although the control is more restricted than the normal automated driving control, the restricted control is a vehicle control capable of preventing the vehicle C from contacting with the front obstacle and preventing the vehicle C from deviating from a traveling lane, by controlling both of the longitudinal and lateral directions of the vehicle C. The front millimeter wave radar 30 and the front camera 40 are respectively provided as the first sensor unit that receives supply of electric power from the first power supply unit 21, and the front lateral millimeter wave radar 50 and the peripheral camera 60 are respectively provided as the second sensor unit that receives supply of electric power from the first power supply unit 21. Therefore, even when one of these sensors becomes abnormal, or even when either the first power supply unit 21 or the second power supply unit 22 becomes abnormal, control in the longitudinal and lateral directions is continuable.

In S13, it is determined whether an elapsed time from requesting the driver for takeover in S11 has exceeded a preset takeover time. The takeover time may be a fixed amount of time, or may be a time that changes depending on the configuration having abnormality, or depending on the type of road on which the vehicle is traveling. An example of the takeover time is, for example, 15 seconds. If the determination result in S13 is NO, the process proceeds to S14.

In S14, it is determined whether the takeover has been complete. Various methods can be used to determine that the takeover has been complete. For example, a condition for completing the takeover may be that the driver grips the steering wheel with both hands, which can be detected by an in-vehicle camera or the like. Furthermore, a condition for completing the takeover may be pushing a takeover completion button prepared in advance by the driver.

When the determination result in S14 is YES, the process proceeds to S15. In S15, the control is switched to a manual control. Therefore, the restricted control ends. When the determination result in S14 is NO, the process returns to S12, and the restricted control is continued.

When the determination in S13 is YES, that is, the takeover time has elapsed during the restricted control, the process proceeds to S16. In S16, the vehicle C is brought to an emergency stop. Note that even when the takeover time has not elapsed, the vehicle C may be brought to an emergency stop if an abnormality occurs in some of the configurations.

SUMMARY OF THE EMBODIMENT

In the embodiment described above, the front millimeter wave radar 30, the front camera 40, and the SoC 71 are connected to the first power supply unit 21, and the front lateral millimeter wave radar 50, the peripheral camera 60, and the SoC 72 are connected to the second power supply unit 22.

Therefore, even when one or more of the front millimeter wave radar 30, the front camera 40, the SoC 71, and the first power supply unit 21 become abnormal, the front lateral millimeter wave radar 50, the peripheral camera 60, the SoC 72, and the second power supply unit 22 enable continuation of the travel of the vehicle C by conducting control of the vehicle C in both of the longitudinal direction and the lateral direction of the vehicle C as the restricted control (S12). Furthermore, even when one or more of the front lateral millimeter wave radar 50, the peripheral camera 60, the SoC 72, and the second power supply unit 22 become abnormal, the front millimeter wave radar 30, the front camera 40, the SoC 71, and the first power supply unit 21 enable continuation of the travel of the vehicle C by controlling both the longitudinal and lateral directions of the vehicle C as the restricted control (S12).

In addition, when the front millimeter wave radar 30, the front camera 40, the front lateral millimeter wave radar 50, the peripheral camera 60, the first power supply unit 21, and the second power supply unit 22 are all normal, a high-precision normal automated driving control is performable by using all sensors.

In other words, the vehicle device 10 of the present embodiment uses the same sensors in the restricted control as the normal automated driving control, when assuming as a reference that is the normal automated driving control uses all of the front millimeter wave radar 30, the front camera 40, the front lateral millimeter wave radar 50, and the peripheral camera 60. Therefore, while suppressing the increase in the number of configuration elements, it is possible to continue travel of the vehicle by controlling both of the longitudinal and lateral directions even in the event of having an abnormality.

The vehicle device 10 includes the front millimeter wave radar 30 and the front camera 40 as the first sensor unit. The front millimeter wave radar 30 and the front camera 40 are both front-facing sensors, and even vehicles that do not perform a level 3 automated driving are equipped with those sensors for an inter-vehicle distance control and a lane keeping control. Therefore, according to the configuration in which the front millimeter wave radar 30 and the front camera 40 are used as the first sensor unit, it is easy for the configuration of the vehicle device 10 to have an addition of the configuration elements, i.e., to have the second sensor unit later as an additional element of the configuration.

Other Embodiments

FIG. 6 shows sensors that can be used in the first sensor unit or the second sensor unit, including the sensor described in the first embodiment. In FIG. 6, the sensors having a check mark for a longitudinal direction control, that is, V1 to V3 and VH, mean that they are sensors capable of detecting information required for performing the longitudinal direction control of the vehicle C. In FIG. 6, the sensors with a check mark for a lateral direction control, i.e., H1 to H3 and VH, mean that they are sensors capable of detecting information required for performing the lateral direction control of the vehicle C.

Figure 7:
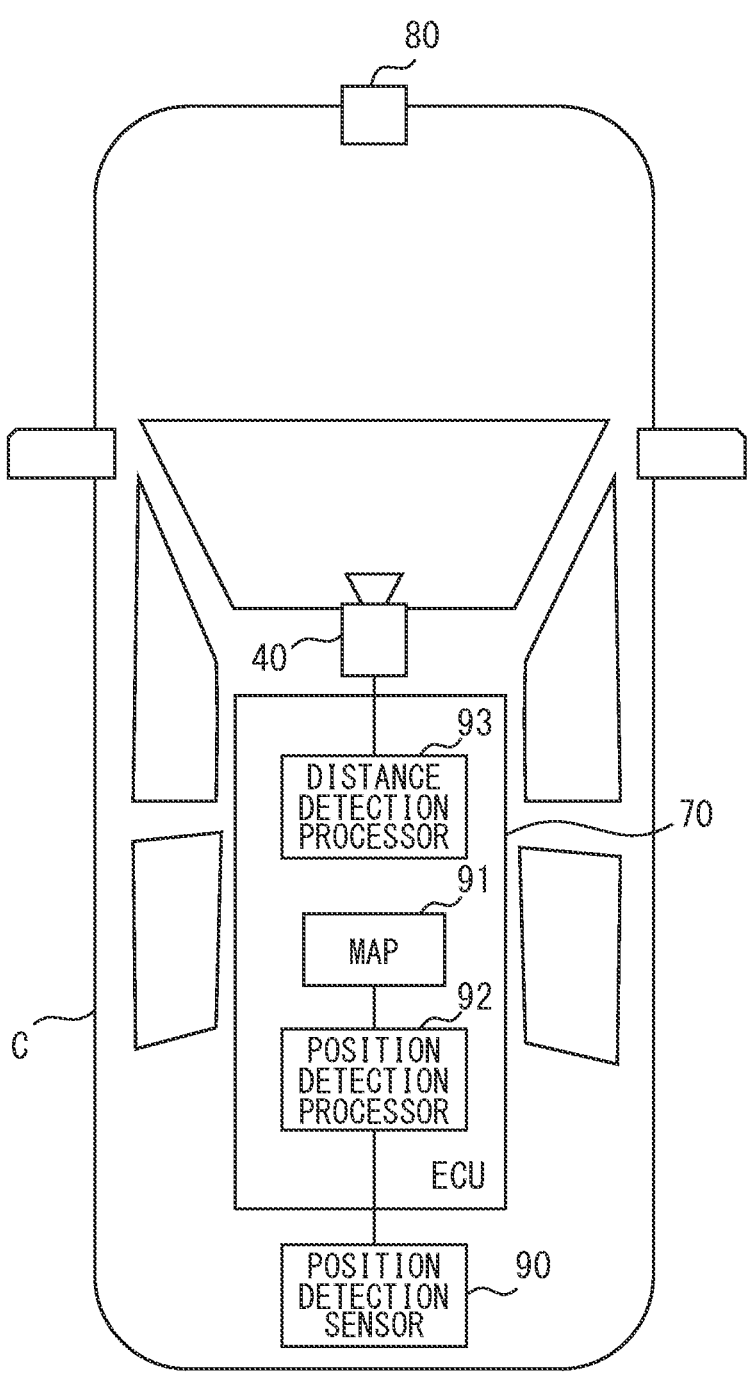
FIG. 7 is a diagram showing a part of the sensors shown in FIG. 6.

The front millimeter wave radar 30 in the first row and the front lateral millimeter wave radar 50 in the second row have already been described in the first embodiment. These are sensors capable of detecting information required for performing the longitudinal direction control of the vehicle C. The third row shows a Lidar 80 as a sensor capable of detecting information required for performing the longitudinal direction control the vehicle C. FIG. 7 shows an example of the mounting position of the Lidar 80. In FIG. 7, the Lidar 80 is mounted at a front end of the vehicle C and at the center in the width direction. However, the position of the Lidar 80 is not limited to the position shown in FIG. 7, that is, for example, the Lidar 80 may be mounted at the position of the front camera 40. The field of view of the Lidar 80 may be the same as that of the front millimeter wave radar 30. Further, the field of view of the Lidar 80 may be wider than that of the front millimeter wave radar 30, that is, for example, the same field of view as the front camera 40. The Lidar 80 detects a position of an object by irradiating a field of view with a laser beam and receiving reflected light of the laser beam.

The front camera 40 on the fourth row and the peripheral camera 60 on the fifth row in FIG. 6 have also been explained in the first embodiment. These have been described as sensors capable of detecting information required for performing the lateral direction control of the vehicle C.

The sixth row shows a position detection sensor 90 as a sensor capable of detecting information required for performing the lateral direction control of the vehicle C. The position detection sensor 90 is used together with a map 91. FIG. 7 shows the position detection sensor 90 and the map 91. The position detection sensor 90 detects a current position of the vehicle C. For example, a GNSS receiver is a specific example of the position detection sensor 90. Alternatively, the position detection sensor 90 may be configured to sequentially detect a moving direction and a moving distance of the vehicle C using an inertia sensor. Alternatively, the position detection sensor 90 may be a combination of the GNSS receiver and the inertia sensor.

The map 91 is stored in a predetermined storage memory, and is digital map data in which a road map including lane positions is written. All of the digital map data may be stored in advance in the storage memory, or data of an area determined by the current position of the vehicle C may be sequentially downloaded and stored therein. The ECU 70 has a function as a position detection processor 92. The position detection processor 92 acquires a signal from the position detection sensor 90, and determines coordinates indicating the position of the vehicle C. The coordinates include (x, y) information. Further, the coordinates may include height information.

Furthermore, the position detection processor 92 uses the coordinates and the map 91 to sequentially determine a distance in the road width direction, which is a distance in the road width direction between the vehicle C and the road boundary closest to the vehicle C. Since the coordinates include (x, y) information, the coordinates are an example of the lateral position information. By using the lane positions included in the map 91 together with the coordinates, the distance in the road width direction is determinable.

In addition to the fourth row, the seventh row also shows the front camera 40. However, in the seventh row, the distance detection processor 93 shown in FIG. 7 is used together with the front camera 40. The configuration described above enables both of the longitudinal direction control and the lateral direction control as shown in FIG. 6.

The processing contents of the distance detection processor 93 will be explained. The distance detection processor 93 acquires image data taken by the front camera 40, which is a monocular camera, and calculates, from the image data, a distance to an object captured in the image. For example, in a photographed image, the distance to the object is calculated by taking advantage of the fact that a shape of the blur is different on a far side and on a near side of the focal point. Furthermore, for the object whose size is specifiable or estimable one, such as a vehicle, the distance can also be calculated from the size of the object shown in the image. Therefore, the distance to the front obstacle is calculable, and the longitudinal direction control is performable.

FIG. 8 shows a combination pattern of sensors that realizes the first sensor unit and the second sensor unit. In FIG. 8, the alphanumeric characters listed in the "combination" column correspond to the alphanumeric characters shown in FIG. 6. The four or three sensors shown in the "combination" each include two V and two H sensors. The sensors shown in "combination" are distributed to the first sensor unit and the second sensor unit so that each of them includes one V and one H.

In FIG. 8, the first power supply unit 21 and the SoC 71 are written in the row below the first sensor unit, which means that the first sensor unit receives supply of electric power from the first power supply unit 21, and the SoC 71 also receives supply of electric power from the power supply unit 21. The second power supply unit 22 and the SoC 72 are written in the row below the second sensor unit, which means that the second sensor unit receives supply of electric power from the second power supply unit 22, and the SoC 72 also receives supply of electric power from the second power supply unit 22.

By combining the sensors as shown in FIG. 8, as in the first embodiment, even when one or more of the first sensor unit, the first power supply unit 21, and the SoC 71 become abnormal, the second sensor unit, the second power supply unit 22, and the SoC 72 can continue the longitudinal direction control and the lateral direction control for the vehicle C. Furthermore, even when one or more of the second sensor unit, second power supply unit 22, and SoC 72 become abnormal, the first sensor unit, the first power supply unit 21, and the SoC 71 can continue the longitudinal direction control and the lateral direction control for the vehicle C. In addition, when both of the first sensor unit and the second sensor unit are normal, a highly-accurate normal automated driving control is performable by using both of the first sensor unit and the second sensor unit.

In the second row of pattern 1, the first sensor unit includes the front lateral millimeter wave radar 50 and the front camera 40, and the second sensor unit includes the front millimeter wave radar 30 and the peripheral camera 60. Combining these will result in the same combination of sensors as in the first embodiment. Therefore, the combination in the second row of pattern 1 allows the same normal automated driving control as in the first embodiment.

In the first row of pattern 2, the first sensor unit includes the front lateral millimeter wave radar 50 and the front camera 40, and the second sensor unit includes the lidar 80, the position detection sensor 90, and the map 91. The first sensor unit is the same as the first sensor unit of the first embodiment. Therefore, it becomes easy to add the second sensor unit later to configure the vehicle device 10. In the first row of pattern 2, the first sensor unit includes the front millimeter wave radar 30 and the second sensor unit includes the lidar 80, thereby enabling, in the normal automated driving control, a highly-accurate longitudinal direction control by using the front millimeter wave radar 30 and the lidar 80.

The second row of pattern 2 is the same as the first row of pattern 2 when the first sensor unit and the second sensor unit are combined. Therefore, as in the first row of pattern 2, a highly-accurate longitudinal control is enabled in the normal automated driving control by using the front millimeter wave radar 30 and the lidar 80.

In the first row of pattern 3, the first sensor unit includes the front lateral millimeter wave radar 50 and the front camera 40, and the second sensor unit includes the lidar 80 and the peripheral camera 60. The first sensor unit is the same as the first sensor unit of the first embodiment. Therefore, it becomes easy to add the second sensor unit later to configure the vehicle device 10. Further, in the normal automated driving control, a highly-accurate longitudinal control by using the front millimeter wave radar 30 and the Lidar 80 is enabled.

The second row of pattern 3 becomes the same as the first row of pattern 3 when the first sensor unit and the second sensor unit are combined. Therefore, this pattern also enables a highly-accurate longitudinal control in the normal automated driving control by using the front millimeter wave radar 30 and the Lidar 80.

Pattern 4 is a configuration in which the first sensor unit includes the front camera 40 and the distance detection processor 93, and is a configuration in which the second sensor unit includes the lidar 80, the position detection sensor 90, and the map 91.

Pattern 5 is a configuration in which the first sensor unit includes the front camera 40 and the distance detection processor 93, and the second sensor unit also includes the front camera 40 and the distance detection processor 93. With the symbols shown in FIG. 6, both are represented as VH. However, in order to indicate that they are mutually different configuration elements, they are indicated as VH1 and VH2 in FIG. 8. The front camera 40 included in the first sensor unit is afirst front camera, and the front camera 40 included in the second sensor unit is a second front camera.

According to the configuration of pattern 5, since two front cameras 40 can be used in the normal automated driving control, these two front cameras 40 can function as a stereo camera.

Pattern 6 is a configuration in which the first sensor unit includes the front camera 40 and the distance detection processor 93, and is a configuration in which the second sensor unit includes the front lateral millimeter wave radar 50 and the peripheral camera 60.

The first row of pattern 7 is a configuration in which the first sensor unit includes the front lateral millimeter wave radar 50 and the front camera 40, and the second sensor unit includes the front lateral millimeter wave radar 50, the position detection sensor 90, and the map 91. The first sensor unit is the same as the first sensor unit of the first embodiment. Therefore, it becomes easy to add the second sensor unit later to configure the vehicle device 10.

In the second row of pattern 7, the first sensor unit includes the front lateral millimeter wave radar 50 and the front camera 40, and the second sensor unit includes the front millimeter wave radar 30, the position detection sensor 90, and the map 91. The second row of pattern 7 is the same as the first row of pattern 7 when the first sensor unit and the second sensor unit are combined.

Although the embodiments of the present disclosure have been described above, the disclosed technology is not limited to the above-mentioned embodiments, and the following modifications are also included within the disclosed scope, and furthermore, other than the following can also be implemented with various modifications within the scope of the gist.

<Modification 1>

In the above-described embodiments, both of the SoC 71 and the SoC 72 are capable of performing the normal automated driving control. However, only one of the SoC 71 and the SoC 72 may be capable of performing the normal automated driving control.

<Modification 2>

In the above-described embodiments, when no abnormality is detected (S1: NO), the longitudinal integration process (S4) and the lateral integration process (S5) are performed. However, either one of S4 and S5 may be omitted and only one of the longitudinal integration process and the lateral integration process may be performed.

<Modification 3>

In S1, in addition to determining whether the power supply units 21 and 22, the first sensor unit, and the second sensor unit are abnormal, it is also determined whether the SoCs 71 and 72 are abnormal. However, of the SoCs 71 and 72, it is not necessary to determine whether or not there is an abnormality for one of the SoCs 71 and 72 that is not performing the normal automated driving control. This is because one of the SoCs 71 and 72 that is not performing the normal automated driving control will not cause problem with the normal automated driving control.

<Modification 4>

The SoCs 71 and 72 described in the present disclosure are control sections described below. This control section and its method may be realized by a special purpose computer comprising a processor programmed to perform one or more functions embodied by a computer program. Alternatively, the control section and the method described in the present disclosure may be realized by dedicated hardware logic circuits. Alternatively, the control section and the method described in the present disclosure may be realized by one or more dedicated computers configured by a combination of a processor that executes a computer program and one or more hardware logic circuits. The hardware logic circuit is, for example, an ASIC or an FPGA.

Furthermore, the storage medium that stores the computer program is not limited to the ROM, but may be any computer-readable, non-transitory tangible recording medium that stores the computer program as instructions to be executed by the computer. For example, the program may be stored in a flash memory.

What is claimed is:

1. A vehicle device for use in a vehicle, comprising:

a first power supply unit;

a second power supply unit;

a first sensor unit operable when supplied with electric power from the first power supply unit to detect a front obstacle in front of the vehicle and to detect lateral position information on a position of the vehicle in a road width direction;

a first control device operable when supplied with electric power from the first power supply unit to control the vehicle based on a detection result of the first sensor unit;

a second sensor unit operable when supplied with electric power from the second power supply unit to detect the front obstacle and to detect the lateral position information; and a second control device operable when supplied with electric power from the second power supply unit to control the vehicle based on a detection result of the second sensor unit, wherein the first control device is configured to perform, when at least one of the second power supply unit, the second sensor unit, and the second control device is detected as abnormal, a degeneration operation by using the first sensor unit and by not using the second sensor unit, wherein the degeneration operation is a vehicle control to output an instruction to an acceleration/deceleration device to accelerate/decelerate the vehicle and to output an instruction to a steering device to perform a steering operation of the vehicle to allow the vehicle to travel while detecting the front obstacle and the lateral position information and restricted than a normal automated driving control performed at a time of detecting no abnormality, and the second control device is configured to perform, when at least one of the first power supply unit, the first sensor unit, and the first control device becomes abnormal, the degeneration operation by not using the first sensor unit and by using the second sensor unit to output an instruction to the acceleration/deceleration device to accelerate/decelerate the vehicle and to output an instruction to the steering device to perform a steering operation of the vehicle.

2. The vehicle device according to claim 1, wherein one or both of the first control device and the second control device are configured to implement, when the first power supply unit, the first sensor unit, the first control device, the second power supply unit, the second sensor unit, and the second control device are normal, at least one of:

a longitudinal integration process to acquire detection results of the front obstacle respectively from the first sensor unit and the second sensor unit, and integrate the detection results of the front obstacle; and a lateral integration process to acquire the lateral position information, and integrate the lateral position information.

3. The vehicle device according to claim 1, wherein the first sensor unit includes:

a front millimeter wave radar having a field of view in a range including a front of the vehicle and configured to detect the front obstacle using a millimeter wave; and a front camera having a field of view ranging from the front to a diagonal side of the vehicle and configured to detect, as the lateral position information, a lane boundary existing on a lateral side of the vehicle.

4. The vehicle device according to claim 3, wherein the second sensor unit includes:

a front lateral millimeter wave radar having a field of view ranging from the lateral side of the vehicle toward the front of the vehicle and configured to detect the front obstacle using the millimeter wave; and a peripheral camera having a field of view including the lateral side of the vehicle and a periphery of the vehicle and configured to detect the lane boundary on the lateral side of the vehicle.

5. The vehicle device according to claim 3, wherein the second sensor unit includes:

a Lidar having a field of view in a range including the front of the vehicle and configured to detect the front obstacle using a laser beam; and a position detection sensor configured to detect, as the lateral position information, coordinates of the vehicle, and the second control device is configured to acquire a lane position of a road, on which the vehicle travels, from map data, and determine a distance between the vehicle and a lane in the road width direction based on the lane position and the coordinates of the vehicle detected by the second sensor unit.

6. The vehicle device according to claim 3, wherein the second sensor unit includes:

a Lidar having a field of view that includes the front of the vehicle and configured to detect the front obstacle using a laser beam; and a peripheral camera having a field of view including the lateral side of the vehicle and a surrounding area of the vehicle and configured to detect the lane boundary existing on the lateral side of the vehicle.

7. The vehicle device according to claim 3, wherein the second sensor unit includes:

a front lateral millimeter wave radar having a field of view ranging from the lateral side of the vehicle toward the front of the vehicle and configured to detect the front obstacle using the millimeter wave; and a position detection sensor configured to detect, as the lateral position information, coordinates of the vehicle, and the second control device is configured to acquire a lane position of a road, on which the vehicle travels, from map data, and determine a distance between the vehicle and a lane in the road width direction based on the lane position and the coordinates of the vehicle detected by the second sensor unit.

8. The vehicle device according to claim 1, wherein the first sensor unit includes:

a front lateral millimeter wave radar having a field of view ranging from a lateral side of the vehicle toward the front of the vehicle and configured to detect the front obstacle using a millimeter wave; and a front camera having a field of view ranging from the front to a diagonal side of the vehicle and configured to detect, as the lateral position information, a lane boundary existing on a lateral side of the vehicle, and the second sensor unit includes:

a front millimeter wave radar having a field of view in a range including a front of the vehicle and configured to detect the front obstacle using a millimeter wave; and a peripheral camera having a field of view including the lateral side of the vehicle and a surrounding area of the vehicle and configured to detect a lane boundary existing on the lateral side of the vehicle.

9. The vehicle device according to claim 1, wherein the first sensor unit includes:

a first front camera having a field of view ranging from the front to a diagonal side of the vehicle and configured to detect, as the lateral position information, a lane boundary on a lateral side of the vehicle and the front obstacle, and the second sensor unit includes:

a second front camera having a field of view ranging from the front to a diagonal side of the vehicle and configured to detect the lane boundary and the front obstacle.

10. The vehicle device according to claim 1, wherein the first sensor unit includes:

a front camera having a field of view ranging from the front to a diagonal side of the vehicle and configured to detect, as the lateral position information, a lane boundary existing on a lateral side of the vehicle, and the second sensor unit includes:

a front lateral millimeter wave radar having a field of view ranging from a lateral side toward the front of the vehicle and configured to detect the front obstacle using a millimeter wave; and a peripheral camera having a field of view including the lateral side of the vehicle and a periphery of the vehicle and configured to detect the lane boundary on the lateral side of the vehicle.

11. The vehicle device according to claim 1, wherein one of the first sensor unit and the second sensor unit includes a position detection sensor configured to detect, as the lateral position information, coordinates of the vehicle, and one of the first control device and the second control device, which is supplied with electric power from a power supply unit that is configured to supply electric power to the position detection sensor, is configured to acquire a lane position of a road, on which the vehicle travels, from map data, and determine a distance between the vehicle and a lane in the road width direction based on the lane position and the coordinates of the vehicle detected by the position detection sensor.

12. A vehicle control method to be implemented by a processor for a vehicle, the vehicle including: a first power supply unit; a second power supply unit; a first sensor unit operable when supplied with electric power from the first power supply unit to detect a front obstacle in front of the vehicle and to detect lateral position information on a position of the vehicle in a road width direction; and a second sensor unit operable when supplied with electric power from the second power supply unit to detect the front obstacle and to detect the lateral position information, the vehicle control method comprising:

performing, when the first power supply unit, the first sensor unit, the second power supply unit, and the second sensor unit are normal, at least one of a longitudinal integration process to acquire detection results of the front obstacle respectively from the first sensor unit and the second sensor unit and integrate the detection results of the front obstacle, and a lateral integration process to acquire the lateral position information respectively from the first sensor unit and the second sensor unit and integrate the lateral position information;

performing, when at least one of the second power supply unit and the second sensor unit is detected as abnormal, a degeneration operation by using the first sensor unit and by not using the second sensor unit, wherein the degeneration operation is a vehicle control to output an instruction to an acceleration/deceleration device to accelerate/decelerate the vehicle and to output an instruction to a steering device to perform a steering operation of the vehicle to allow the vehicle to travel while detecting the front obstacle and the lateral position information and restricted than a normal automated driving control performed at a time of detecting no abnormality; and performing, when at least one of the first power supply unit and the first sensor unit is detected as abnormal, the degeneration operation by not using the first sensor unit and by using the second sensor unit to output an instruction to the acceleration/deceleration device to accelerate/decelerate the vehicle and to output an instruction to the steering device to perform a steering operation of the vehicle.

13. A vehicle device for a vehicle, comprising:

a first power supply;

a second power supply;

a first sensor operable when supplied with electric power from the first power supply to detect a front obstacle in front of the vehicle and to detect lateral position information on a position of the vehicle in a road width direction;

a first controller operable when supplied with electric power from the first power supply to control the vehicle based on a detection result of the first sensor;

a second sensor operable when supplied with electric power from the second power supply to detect the front obstacle and to detect the lateral position information; and a second controller operable when supplied with electric power from the second power supply to control the vehicle based on a detection result of the second sensor, wherein the first controller is configured to perform, when at least one of the second power supply, the second sensor, and the second controller is detected as abnormal, a degeneration operation by using the first sensor and by not using the second sensor, wherein the degeneration operation is a vehicle control to output an instruction to an acceleration/deceleration device to accelerate/decelerate the vehicle and to output an instruction to a steering device to perform a steering operation of the vehicle to allow the vehicle to travel while detecting the front obstacle and the lateral position information and restricted than a normal automated driving control performed at a time of detecting no abnormality, and the second controller is configured to perform, when at least one of the first power supply, the first sensor, and the first controller becomes abnormal, the degeneration operation by not using the first sensor and by using the second sensor to output an instruction to the acceleration/deceleration device to accelerate/decelerate the vehicle and to output an instruction to the steering device to perform a steering operation of the vehicle.

\* \* \* \* \*